(12) United States Patent
Narita

(10) Patent No.: US 10,146,153 B2
(45) Date of Patent: Dec. 4, 2018

(54) IMAGE PROCESSING APPARATUS, IMAGE FORMING APPARATUS, IMAGE PROCESSING METHOD, AND STORAGE MEDIUM

(71) Applicant: CANON KABUSHIKI KAISHA, Tokyo (JP)

(72) Inventor: Tateki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/813,186

(22) Filed: Nov. 15, 2017

(65) Prior Publication Data

US 2018/0149996 A1 May 31, 2018

(30) Foreign Application Priority Data

Nov. 28, 2016 (JP) ................. 2016-230583

(51) Int. Cl.
*G06K 9/32* (2006.01)
*G03G 15/08* (2006.01)
*G03G 15/00* (2006.01)
*H04N 1/00* (2006.01)

(52) U.S. Cl.
CPC ....... *G03G 15/0831* (2013.01); *G03G 15/556* (2013.01); *G06T 2207/10008* (2013.01); *G06T 2207/10024* (2013.01); *H04N 1/00411* (2013.01)

(58) Field of Classification Search
CPC G06T 2207/10008; G06T 2207/10024; G03G 15/0831; G03G 15/556; H04N 1/00411
See application file for complete search history.

(56) References Cited

U.S. PATENT DOCUMENTS

| 7,099,042 B2* | 8/2006 | Yaguchi | H04N 1/4074 358/1.9 |
| 2008/0088858 A1* | 4/2008 | Marcu | H04N 1/407 358/1.6 |
| 2011/0080607 A1* | 4/2011 | Ulichney | G06K 9/00483 358/1.15 |

FOREIGN PATENT DOCUMENTS

| JP | 2000-013616 A | | 1/2000 | |
| JP | 2014068703 | * | 4/2014 | ............... A61B 3/10 |

* cited by examiner

*Primary Examiner* — Amara Abdi
(74) *Attorney, Agent, or Firm* — Fitzpatrick, Cella, Harper & Scinto

(57) ABSTRACT

An image processing apparatus includes a memory device that stores a set of instructions and at least on processor that executes the set of instructions to set a sampling condition under which a pixel of an image is sampled based on information indicating at least a number of bits of a pixel of the image, to sample a pixel of the image based on a set sampling condition, and to analyze the image based on sampled pixel data. When a number of bits of a pixel of the image is greater than or equal to a predetermined number of bits, a sampling condition is set so that a sampling interval becomes greater than that in a case when a number of bits of a pixel of the image is less than the predetermined number of bits.

8 Claims, 11 Drawing Sheets

| FUNCTION | BIT DEPTH [BPP] | RESOLUTION [DPI × DPI] | LOCAL AREA (MAIN SCAN) [PIXEL] | LOCAL AREA (SUB SCAN) [PIXEL] | SHIFT AMOUNT (MAIN SCAN) [PIXEL] | SHIFT AMOUNT (SUB SCAN) [PIXEL] |
|---|---|---|---|---|---|---|
| PDL | 1 | 1200 × 1200 | 32 | 16 | 32 | 48 |
| PDL | 1 | 600 × 600 | 16 | 8 | 16 | 8 |
| PDL | 2 | 600 × 600 | 16 | 8 | 16 | 24 |
| PDL | 4 | 600 × 600 | 16 | 8 | 16 | 24 |
| FAX | 1 | 400 × 400 | 16 | 5 | 16 | 5 |
| FAX | 1 | 200 × 400 | 8 | 5 | 8 | 5 |
| FAX | 1 | 200 × 200 | 8 | 3 | 8 | 3 |
| FAX | 1 | 200 × 100 | 8 | 2 | 8 | 2 |
| COPY | 1 | 600 × 600 | 16 | 8 | 16 | 8 |
| COPY | 2 | 600 × 600 | 16 | 8 | 16 | 24 |

FIG.6

IMAGE PROCESSING APPARATUS, IMAGE FORMING APPARATUS, IMAGE PROCESSING METHOD, AND STORAGE MEDIUM

CLAIM TO PRIORITY

This application claims the benefit of Japanese Patent Application No. 2016-230583 filed Nov. 28, 2016, which is hereby incorporated by reference wherein in its entirety.

BACKGROUND OF THE INVENTION

Field of the Invention

The present invention relates to an analysis technique of an image in an image forming apparatus that thermally fixes an image onto transfer paper.

Description of the Related Art

In recent years, for an office assisting device, such as a copy machine, a commercial demand for energy saving and higher speed is increasing. As a technique that responds to the commercial demand such as this, there is a technique to increase the speed of analysis of an image that is formed on a printing medium. Japanese Patent Laid-Open No. 2000-013616 has described a method of sampling an original image in accordance with the data size of the original image at the time of detecting pixel data corresponding to a predetermined number of degrees from the original image.

However, unless a sampling condition for an analysis-target image (hereafter, referred to as a target image) is set appropriately, there is a possibility that the analysis time lengthens. In particular, in a case when results of the image analysis are used for subsequent processing, it is necessary to complete the image analysis within a required time by appropriately setting a sampling condition so as to prevent a wait time from occurring in the subsequent processing.

For example, for an electrophotographic image forming apparatus, as a control method of a fixing device, a method is known in which an image analysis to detect an amount of color material (hereafter, referred to as an amount of toner) of an image is performed and the fixing temperature and the fixing speed of the fixing device are changed in accordance with the amount of toner. In a case when a plurality of images is printed continuously by using the method such as this, unless the sampling condition is set appropriately, the image analysis is not completed in time for the printing processing, and therefore, the printing processing is delayed. Because of this, there is a possibility that the printing speed is reduced.

Consequently, an object of the present invention is to provide an image processing apparatus capable of appropriately setting a sampling condition in an image analysis so that the image analysis is completed within a required time.

SUMMARY OF THE INVENTION

The image processing apparatus according to the present invention includes a setting unit configured to set a sampling condition under that a pixel of an image is sampled based on information indicating at least a number of bits of a pixel of the image, a sampling unit configured to sample a pixel of the image based on a sampling condition set by the setting unit, and an analysis unit configured to analyze the image based on pixel data sampled by the sampling unit.

Further features of the present invention will become apparent from the following description of exemplary embodiments with reference to the attached drawings.

BRIEF DESCRIPTION OF THE DRAWINGS

FIG. 6 is a diagram showing an example of a table to determine a sampling condition in toner amount detection;

DESCRIPTION OF THE EMBODIMENTS

In the following, embodiments for embodying the present invention are explained by using the drawings. The configurations shown in the following embodiments are merely exemplary and the present invention is not limited to the configurations shown schematically.

First Embodiment

As described above, an image forming apparatus is known, which controls the fixing speed and the fixing temperature of a fixing device in accordance with an amount of toner. For example, an image forming apparatus is known, which controls adjustment of temperature so that the fixing temperature of a fixing device becomes higher than that in the normal state in the case of detecting an area in which the amount of toner larger than or equal to a predetermined amount is consecutively set from a target image. In the present embodiment, the image forming apparatus such as this is taken as an example. Further, an image forming apparatus that forms an image by superimposing color materials of CMYK is taken as an example.

Figure 1A:
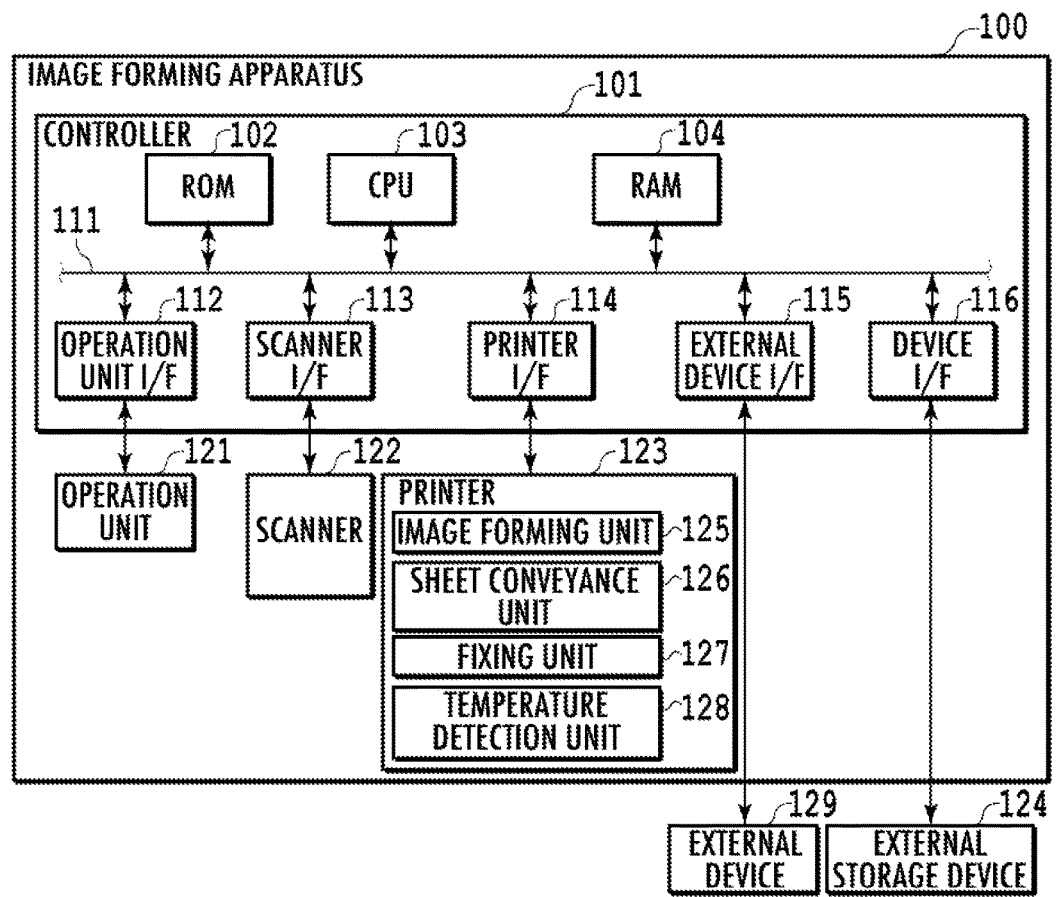
FIG. 1A and FIG. 1B are diagrams for explaining an image forming apparatus of a first embodiment.
Figure 1B:
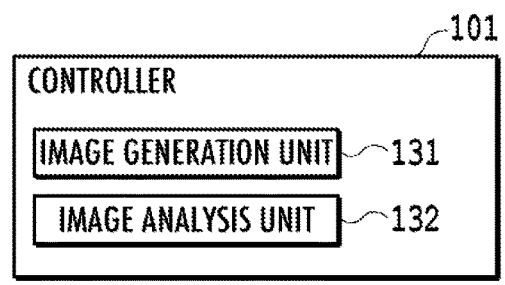

FIG. 1A and FIG. 1B are diagrams for explaining an image forming apparatus 100 of a first embodiment. In FIG. 1A, a block diagram showing an example of a system configuration of the image forming apparatus 100 is shown. In FIG. 1B, a block diagram showing an example of a software configuration of a controller 101 of the image forming apparatus 100 is shown.

The image forming apparatus 100 is an electrophotographic color or monochrome image forming apparatus that uses toner, for example, such as a digital electrophotographic copy machine, a laser printer, and a facsimile. The image forming apparatus 100 includes the controller 101 and modules located outside thereof. As the above-described modules, the image forming apparatus 100 includes an operation unit 121, a scanner 122, a printer 123, an external storage device 124, and an external device 129.

The controller 101 includes a ROM 102, a CPU 103, and a RAM 104. The CPU 103 is a central processing unit (processor) configured to perform control of the entire image forming apparatus 100, arithmetic processing, and so on. The CPU 103 performs each piece of processing, to be described later, based on programs stored in the ROM 102. The ROM 102 is a read-only memory. The ROM 102 stores a system activation program, a program to control a printer engine, character data, character code information, and so on. The RAM 104 is a random access memory and is a data storage area whose use is not limited. The RAM 104 is made use of as an execution area of a program for each piece of various kinds of processing. Further, it is also possible to make use of the RAM 104 as a data storage area of an image file received from the external device 129.

The operation unit 121 includes a display device, such as a liquid crystal panel. The operation unit 121 displays a setting state, an error state, and so on, of the image forming apparatus 100 on the display device. Further, the operation unit 121 includes keys and buttons to change or reset printing settings. It may also be possible for the operation unit 121 to include a touch panel as the display device and to display a user interface to change or reset printing settings on the touch panel. The scanner 122 reads a document, such as paper, by an optical sensor. The printer 123 controls each device (fixing device and the like) of the printer engine. The external storage device 124 is a storage medium (for example, SD card) and stores programs, image data, and so on. Further, the external storage device 124 is made use of to spool data, made use of as a work area of a program, and so on.

The controller 101 further includes a system bus 111, an operation unit interface (I/F) 112, a scanner I/F 113, a printer I/F 114, an external device I/F 115, and a device I/F 116. The operation unit I/F 112 connects with the operation unit 121. The printer I/F 114 connects with the printer 123. The external device I/F 115 connects the image forming apparatus 100 with the external device 129 via a network (for example, LAN) or a FAX line. The device I/F 116 connects with the external storage device 124. The system bus 111 is a data path between each component included in the controller 101.

The printer 123 includes an image forming unit 125, a sheet conveyance unit 126, a fixing unit 127, and a temperature detection unit 128. The image forming unit 125 forms a toner image based on data supplied from the controller 101 via the printer I/F 114 on a transfer belt. The sheet conveyance unit 126 conveys a printing medium (sheet) to the toner image position of the transfer belt. The speed at which the sheet conveyance unit 126 conveys a sheet (sheet conveyance speed) changes depending on the sheet type (basis weight, surface properties, and so on), the temperature state inside the printer 123, the printing mode setting for the image forming apparatus 100, and so on. For example, a the case when the sheet type is a thick sheet whose basis weight is larger than that of a plain sheet or in the case where setting is performed so as to prevent a sheet from curling and prevent dew condensation in the printing mode setting, the sheet conveyance speed is reduced (the operation in the case where the speed is reduced by half is called a half-speed operation). The fixing unit (fixing device) 127 fixes a toner image onto a sheet by applying heat and pressure to raise the temperature to a desired temperature by using the temperature detection unit 128 that comes into contact with the fixing unit 127.

By the configuration as described above, the image forming apparatus 100 implements various printing functions. For example, the PDL function to receive print data described in a PDL (Page Description Language) from the external device I/F 115 and to perform printing by the printer 123 is implemented. Further, for example, the FAX function to receive FAX data from the external device I/F 115 and to perform printing by the printer 123 is implemented. Further, for example, the copy function to print an image read by the scanner 122 by the printer 123 is implemented. Further, for example, the hold printing function to hold image data generated from print data in the RAM 104 and to perform printing by the printer 123 upon receipt of printing instructions from the operation unit 121 is implemented in the PDL function.

FIG. 1B is a block diagram showing a software configuration of the controller 101. As shown in FIG. 1B, the controller 101 has an image generation unit 131 and an image analysis unit 132. That is, the controller 101 in the present embodiment operates as an image processing apparatus. In the present embodiment, the functions (the image generation unit 131 and the image analysis unit 132) possessed by the controller 101 are controlled by the CPU 103 loading control programs stored in the ROM 102 and the like and executing the control programs, and thereby, the processing shown in FIG. 7 and FIG. 11, to be described later, is implemented. It may also be possible for the controller 101 to have a software function other than the image generation unit 131 and the image analysis unit 132.

The image generation unit 131 generates CMYK data (bitmap image data of CMYK) based on the print data received from the external device 129. The CMYK data is data indicating the amount of toner of CMYK for each pixel. The image generation unit 131 stores the generated CMYK data in the RAM 104. Further, at this time, the image generation unit 131 stores image information (bit depth and resolution) on the print data received from the external device 129 in the RAM 104.

The image analysis unit 132 performs an image analysis to detect the amount of toner for the CMYK data stored in the RAM 104. Hereafter, the image analysis that is performed by software as described above is referred to as a software image analysis. The image analysis unit 132 controls the fixing unit 127 based on the analysis results (amount of toner). Specifically, the image analysis unit 132 transmits the analysis results (amount of toner) to the printer 123. Then, on the side of the printer 123, the fixing unit 127 is controlled based on the above-described analysis results.

Figure 2:
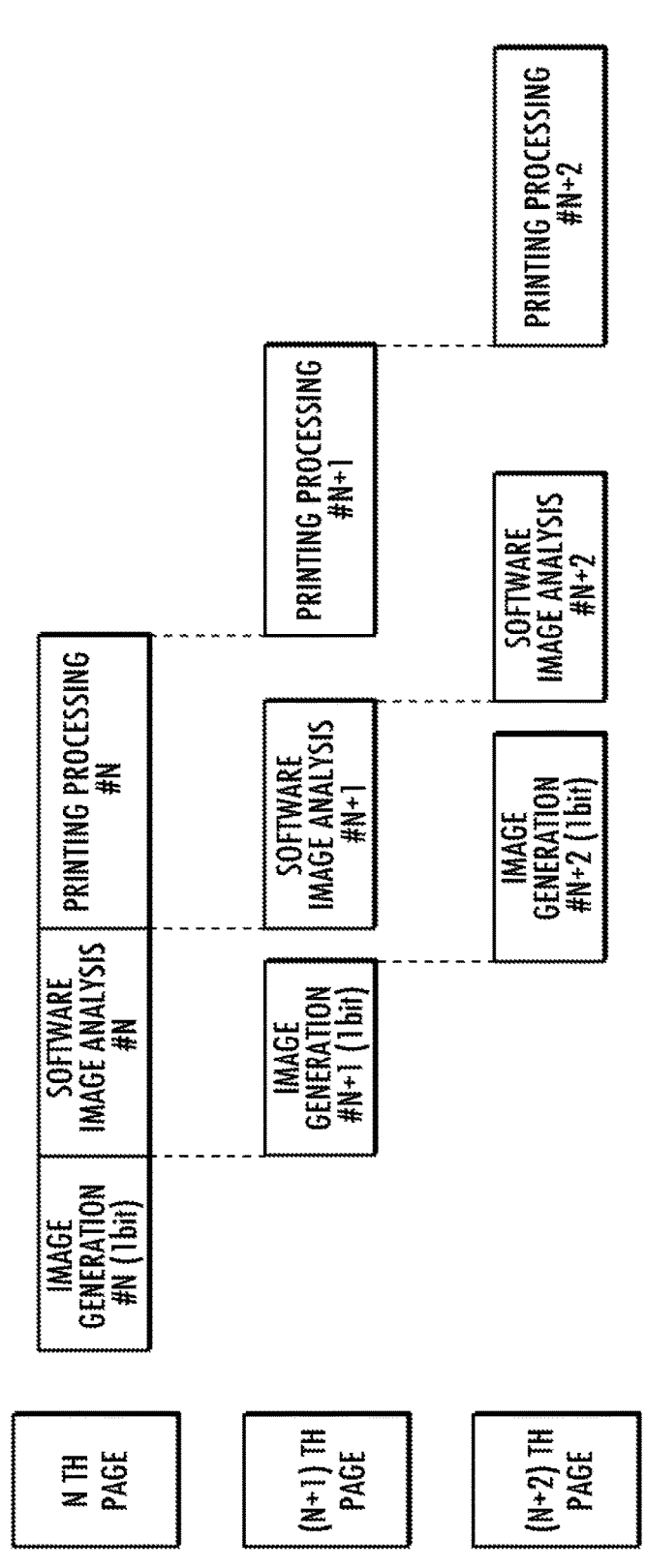
FIG. 2 is a timing chart showing an example of timing at which a conventional software image analysis and printing processing are performed.

FIG. 2 is a timing chart showing an example of timing at which a conventional software image analysis and printing processing are performed. FIG. 2 shows a timing chart at the time of the image forming apparatus 100 performing each piece of processing (image generation to generate an image, a software image analysis to detect an amount of toner of the generated image, and the printing processing) for the received print data of a plurality of pages. Further, FIG. 2 shows a timing chart in the case where the processing time of the image analysis is shorter than the processing time of the printing processing.

Each piece of processing of the image generation, the software image analysis, and the printing processing requires hardware resources (printer and CPU). Because of this, it is not possible to perform each piece of processing for a plurality of pages at the same time. Consequently, as shown in FIG. 2, after the image generation of the Nth page is completed, the image generation of the (N+1)th page is started. This is also the same for the software image analysis and the printing processing. In the example shown in FIG. 2, each piece of processing for the print data of the Nth page is performed in the order of image generation #N, a software image analysis #N, and printing processing #N. Here, #N indicates that the processing is processing of the Nth page. For the print data of the (N+1)th page, image generation #N+1 is performed after the image generation #N is completed, a software image analysis #N+1 is performed after the software image analysis #N is completed, and printing processing #N+1 is performed after the printing processing #N is completed. For the print data of the (N+2)th page, image generation #N+2 is performed after the image generation #N+1 is completed, a software image analysis #N+2 is performed after the software image analysis #N+1 is completed, and printing processing #N+2 is performed after the printing processing #N+1 is completed. Here, it is assumed that an image with a bit depth of 1 (1 bpp) is generated from print data. In the example shown in FIG. 2, the processing time of the software image analyses #N, #N+1, and #N+2 is shorter than that of the printing processing #N, #N+1, and #N+2. Consequently, a reduction in the printing speed due to the software image analysis does not occur.

Figure 3:
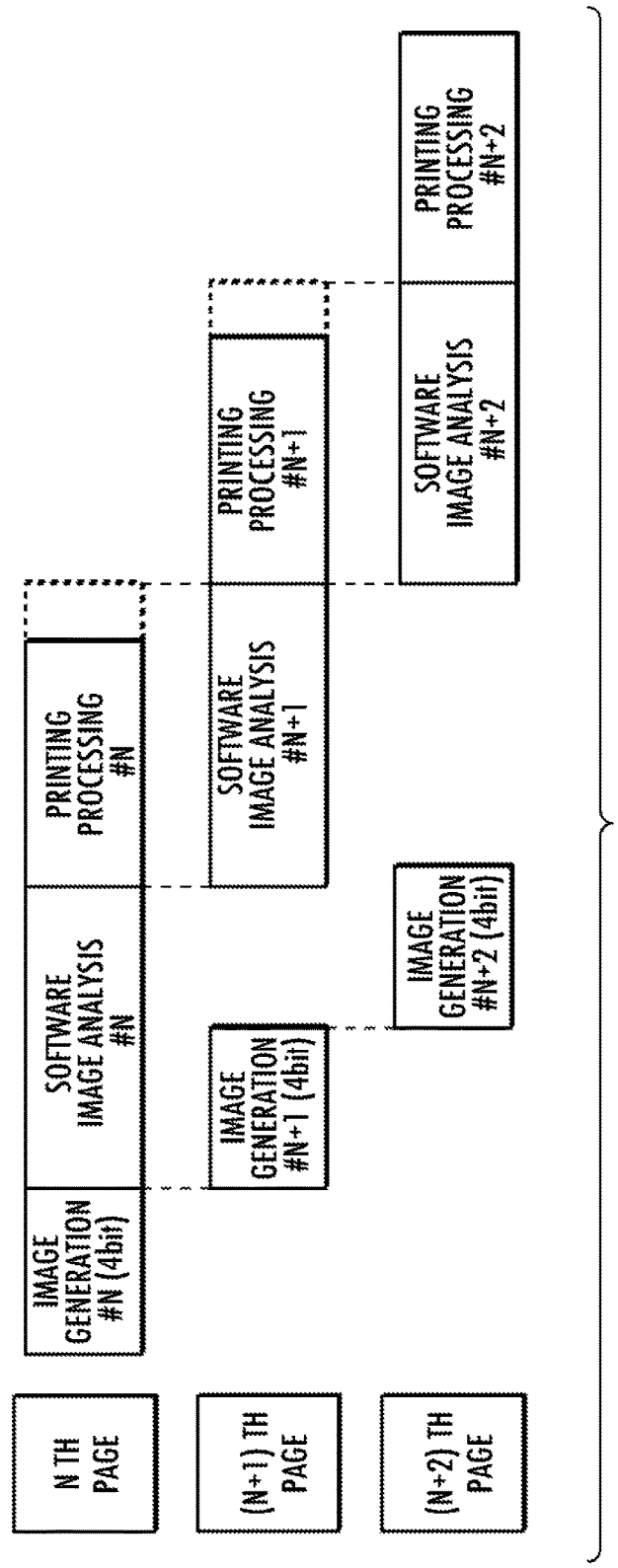
FIG. 3 is a timing chart showing another example of timing at which a conventional software image analysis and printing processing are performed.

FIG. 3 is a timing chart showing another example of a relationship between the conventional image analysis and the printing processing. FIG. 3 shows a timing chart in a case when the processing time of the image analysis is longer than the processing time of the printing processing. The control at the time of performing the image generation, the software image analysis, and the printing processing is the same as that in FIG. 2. Here, it is assumed that an image with a bit depth of 4 (4 bpp) is generated from print data. Consequently, the processing time of the software image analyses #N, #N+1, and #N+2 becomes longer than that in the case of a bit depth of 1. Because of this, as shown in FIG. 3, the processing time of the software image analyses #N+1 and #N+2 becomes longer than that of the printing processing #N and #N+1, respectively, and therefore, a wait occurs between the printing processing #N and #N+1, and the printing processing #N+1 and #N+2 and a reduction in the printing speed occurs.

In the present embodiment, in order to prevent a wait time of the printing processing as shown in FIG. 3 from occurring, the software image analysis (toner amount detection) that is performed before the printing processing is performed in accordance with sampling conditions shown in FIG. 6, to be described later.

Figure 4:
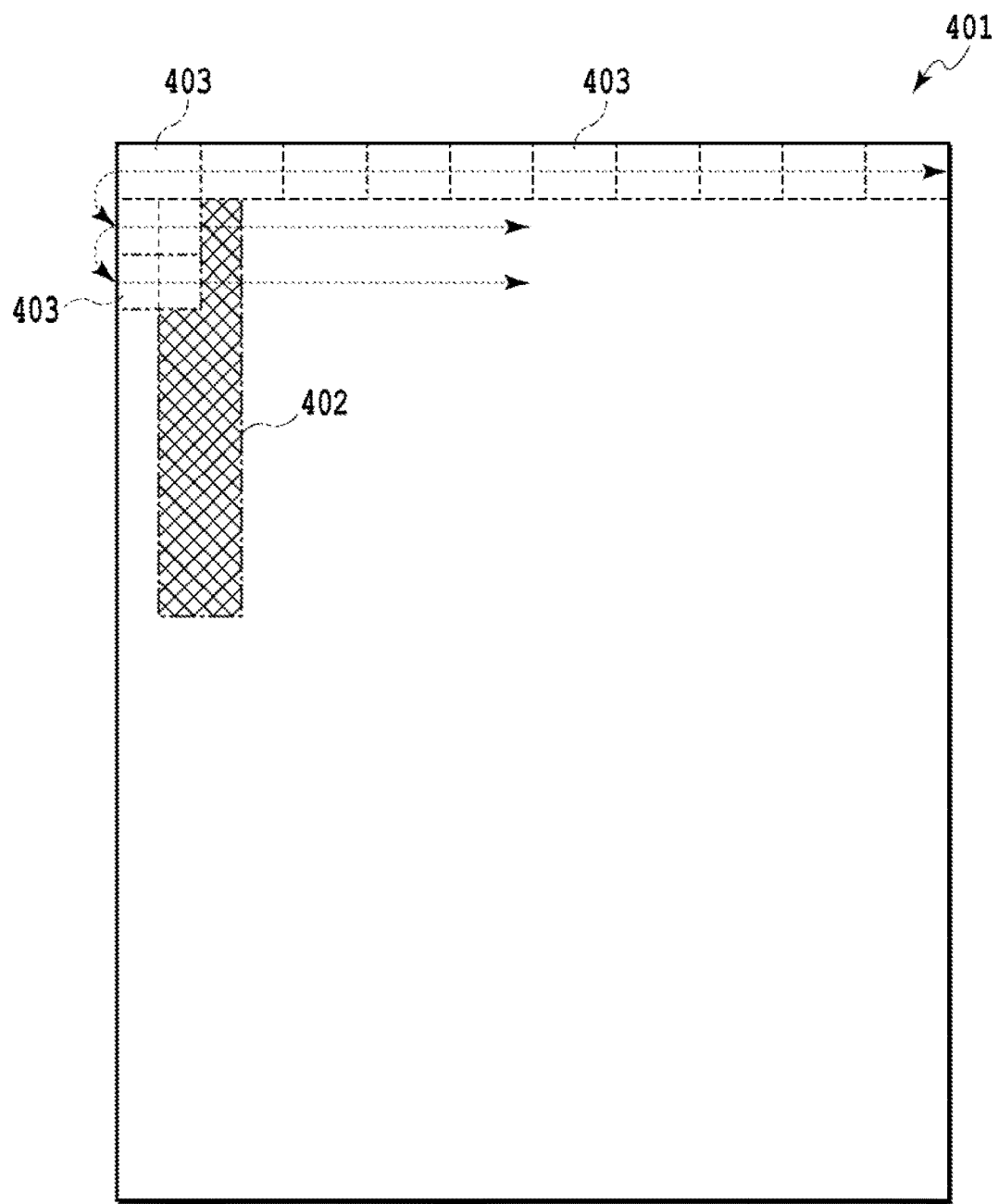
FIG. 4 is a diagram for explaining toner amount detection of the first embodiment.
Figure 5:
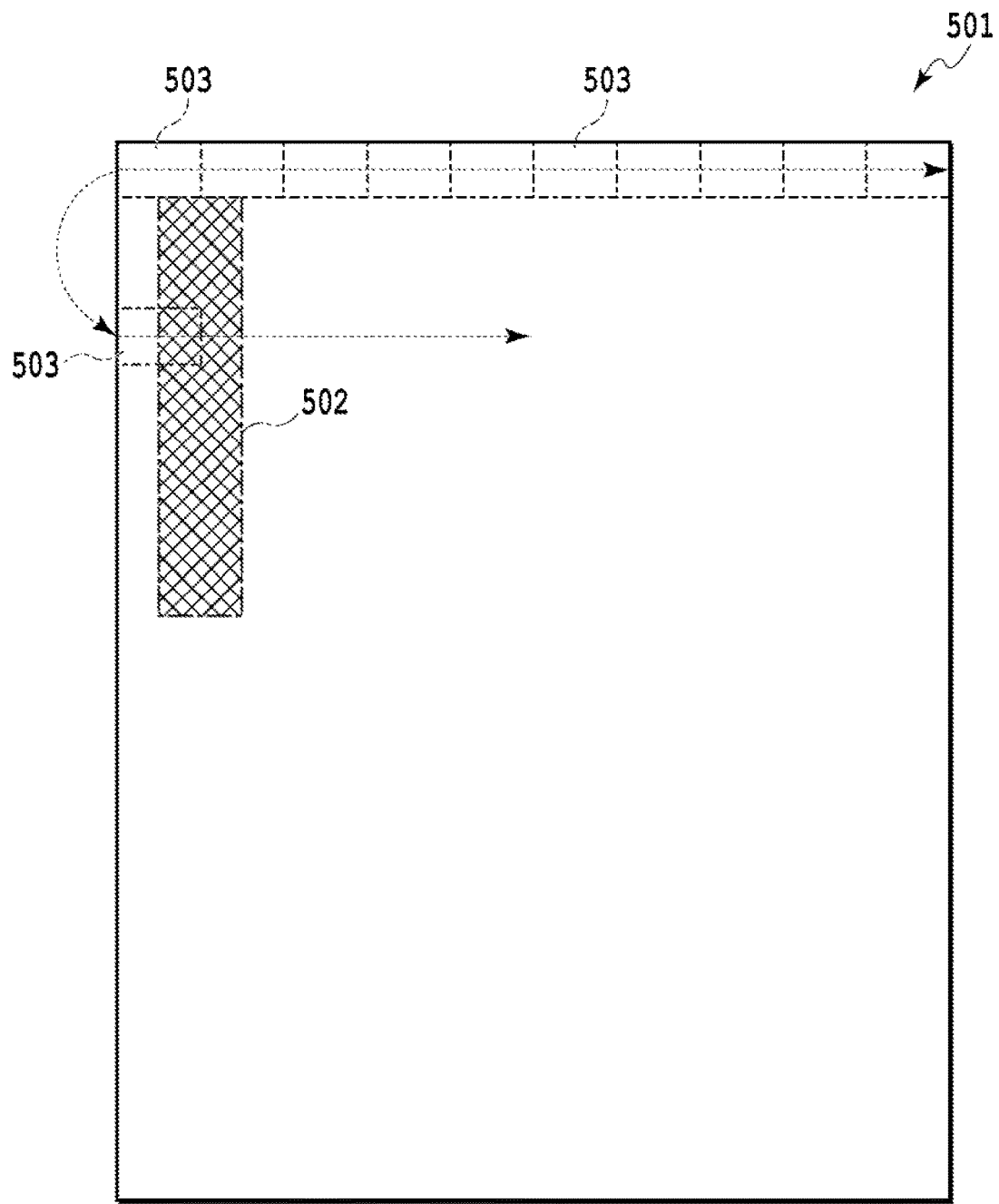
FIG. 5 is a diagram for explaining toner amount detection of the first embodiment.

First, toner amount detection that is performed in the present embodiment is explained by using FIG. 4. FIG. 4 and FIG. 5 are diagrams for explaining the toner amount detection of the first embodiment. As described above, in a case when an area in which the amount of toner larger than or equal to a predetermined amount is consecutively set exists within a target image, the image forming apparatus 100 sets the fixing speed of the fixing device to a low-speed mode. Further, in a case when an area in which the amount of toner larger than or equal to a predetermined amount is consecutively set does not exist within a target image, the image forming apparatus 100 sets the fixing speed of the fixing device to a high-speed mode. Then, the image analysis unit 132 performs an image analysis to detect the amount of toner and determines whether or not an area in which the amount of toner larger than or equal to a predetermined amount is consecutively set and which has a size larger than or equal to a predetermined size (hereinafter, referred to as a consecutive area) exists within an image based on the analysis results. In the present embodiment, the above-described predetermined size (size in the main scanning direction×size in the sub scanning direction) is taken to be 9 mm×112 mm.

An image 401 is a page image that is represented by CMYK data generated from print data by the image generation unit 131. An image area 402 is an area including the amount of toner larger than or equal to a predetermined amount, which is within the image 401. The image analysis unit 132 acquires the density value of a pixel within a local area in order from the top left of the image 401 toward the bottom right (from top left toward bottom right in FIG. 4) for each local area. Then, the image analysis unit 132 detects a local area in which the sum of the density values of pixels is larger than or equal to a predetermined value as a local area in which the amount of toner is larger than or equal to a predetermined amount. Specifically, as indicated by broken-line arrow in FIG. 4, the image analysis unit 132 detects a local area in which the amount of toner is larger than or equal to a predetermined amount while shifting a detection-target local area (local area 403 shown in FIG. 4) in the main scanning direction. Then, in a case when the local area 403 reaches the right end of the image 401, the image analysis unit 132 shifts the local area 403 in the sub scanning direction. Then, the image analysis unit 132 detects again a local area in which the amount of toner is larger than or equal to a predetermined amount while shifting the local area 403 in the main scanning direction. In this manner, detection of a local area is performed in units of lines.

In the example shown in FIG. 4, the amount of shift is the same as the size of the local area 403. Specifically, in a case when the local area 403 is shifted in the sub scanning direction, the local area 403 is shifted by the amount corresponding to the size in the sub scanning direction. In a case when the local area 403 is shifted in the main scanning direction, the local area 403 is shifted by the amount corresponding to the size in the main scanning direction. Due to this, toner amount detection is performed for the image 401 without any gap. The image analysis unit 132 determines whether or not the number of consecutive local areas in which the amount of toner is larger than or equal to a predetermined amount is larger than or equal to a threshold value. Specifically, the image analysis unit 132 counts the number of consecutive local areas in which the amount of toner is larger than or equal to a predetermined amount both in the main scanning direction and in the sub scanning direction. Then, the image analysis unit 132 determines whether there exists an area in which each of the numbers of consecutive local areas in the main scanning direction and in the sub scanning direction is larger than or equal to a threshold value. The threshold value used for determination of the number of consecutive local areas is set in advance based on the size of the detection-target consecutive area. Hereinafter, the amount of shift in the main scanning direction is referred to as a main scan shift amount and the amount of shift in the sub scanning direction is referred to as a sub scan shift amount, respectively. Further, the size in the main scanning direction is referred to as a main scan size and the size in the sub scanning direction is referred to as a sub scan size, respectively.

Next, the sampling processing in the toner amount detection is explained by using FIG. 5. An image 501, an image area 502, and a local area 503 are the same as the image 401, the image area 402, and the local area 403, respectively, shown in FIG. 4. In the case where the detection-target local area 503 reaches the right end of the image 501, the image analysis unit 132 shifts the local area 503 in the sub scanning direction. At this time, the image analysis unit 132 increases the amount of shift in the sub scanning direction so as to be larger than the sub scan size of the local area 503 as indicated by the broken-line arrow in FIG. 5. By setting the sampling interval in the sub scanning direction large as described above, the target area of the toner amount detection for the image 501 is thinned. At this time, for the thinned area (each line), it is assumed that the amount of toner is detected as in the line for which the toner amount detection has been performed immediately before. Then, based on the assumption such as this, the image analysis unit 132 determines whether or not the number of consecutive local areas in which the amount of toner is larger than or equal to a predetermined amount is larger than or equal to a threshold value. As described above, the size in the main scanning direction of the consecutive area in the present embodiment is as small as 9 mm. Consequently, in a case when the sampling interval in the main scanning direction is increased (in a case when the amount of shift in the main scanning direction is increased so as to be larger than the main scan size of the local area 503), there is a possibility that the accuracy of the detection results is reduced. Consequently, as in the example shown in FIG. 4, the image analysis unit 132 reduces the sampling interval in the main scanning direction by making the amount of shift in the main scanning direction the same as the value of the main scan size of the local area 503.

FIG. 6. is a diagram showing an example of a table to determine sampling conditions in the toner amount detection. FIG. 6 shows a table by which it is possible to derive the size of the local area and the amount of shift of the local area from a combination of the function, the bit depth, and the resolution. The image analysis unit 132 determines the size of the local area and the amount of shift of the local area in accordance with a combination of the function, the bit depth, and the resolution by using the table shown in FIG. 6.

In the present embodiment, the physical size of the local area on a sheet is equivalent under any condition. For example, in a case when the size of the local area for a resolution of 600 dip×600 dpi is taken to be 16 pixels×8 pixels, the size of the local area for a resolution of 1200 dpi×1200 dpi is 32 pixels×16 pixels. Here, the size of the local area is represented by main scan size×sub scan size. Further, in the present embodiment, in order to make small the reduction in the accuracy of toner amount detection by sampling, the sub scan size of the local area is set smaller than the main scan size. Due to this, it is made possible to perform finer toner amount detection in the sub scanning direction.

The main scan shift amount and the sub scan shift amount of the local area are set to the same values of the main scan size and the sub scan size of the local area, respectively, in a case when the bit depth is great and the resolution is high, the sub scan shift amount of the local area is set to a value larger than the sub scan size of the local area. As shown in FIG. 6, for example, in the PDL job (bit depth is 1 bpp, resolution is 600 dip×600 dpi), the size and the amount of shift of the local area are the same. On the other hand, in the PDL job (bit depth is 2 bpp, resolution is 600 dpi×600 dpi), the sub scan shift amount (24 pixels) of the local area is set to a value three times the sub scan size (8 pixels) of the local area. The main scan shift amount (16 pixels) of the local area is set to the same size as the main scan size (16 pixels) of the local area. That is, the sampling interval in the main scanning direction is set small. The reason is that, as described above, the size in the main scanning direction of the consecutive area is as small as 9 mm, and therefore, in a case when the sampling interval in the main scanning direction is increased, there is a possibility that the accuracy of the detection results is reduced.

In the table shown in FIG. 6, values in accordance with the detection method of an amount of toner are stored. That is, each value in the table shown in FIG. 6 is a value in accordance with the detection method of an amount of toner explained by using FIG. 4. As each value in the table shown in FIG. 6, it may also be possible to set a value derived based on an actually measured value or to set a value derived by a calculation from information and the like indicating the performance of the image forming apparatus. In a case when the image forming apparatus 100 uses another method as the detection method of an amount of toner, it is sufficient to store values in accordance with the other method in the table shown in FIG. 6. For example, in a case when the image forming apparatus 100 controls the fixing device based on the total amount of toner of the entire image, the toner amount detection to detect the total amount of toner of the entire image is performed. In such a case, values that increase the sampling interval not only in the sub scanning direction but also in the main scanning direction are stored in the table shown in FIG. 6.

Further, in the table shown in FIG. 6, in a case when the bit depth is greater than or equal to a predetermined bit depth (2 bpp or greater), or in a case when the resolution is higher than or equal to a predetermined resolution (600 dpi×600 dpi or higher), values that uniformly triple the amount of shift in the sub scanning direction are stored. However, values that dynamically change (for example, values that stepwise increase) the amount of shift in the sub scanning direction in accordance with the magnitude of the bit depth and the resolution may be stored in the table shown in FIG. 6. According to such an aspect, it is possible to further make small the reduction in the accuracy of the toner amount detection by sampling, and therefore, it is made possible to more appropriately control the fixing device. Consequently, it is possible to further suppress power consumption of the image forming apparatus 100.

Figure 7:
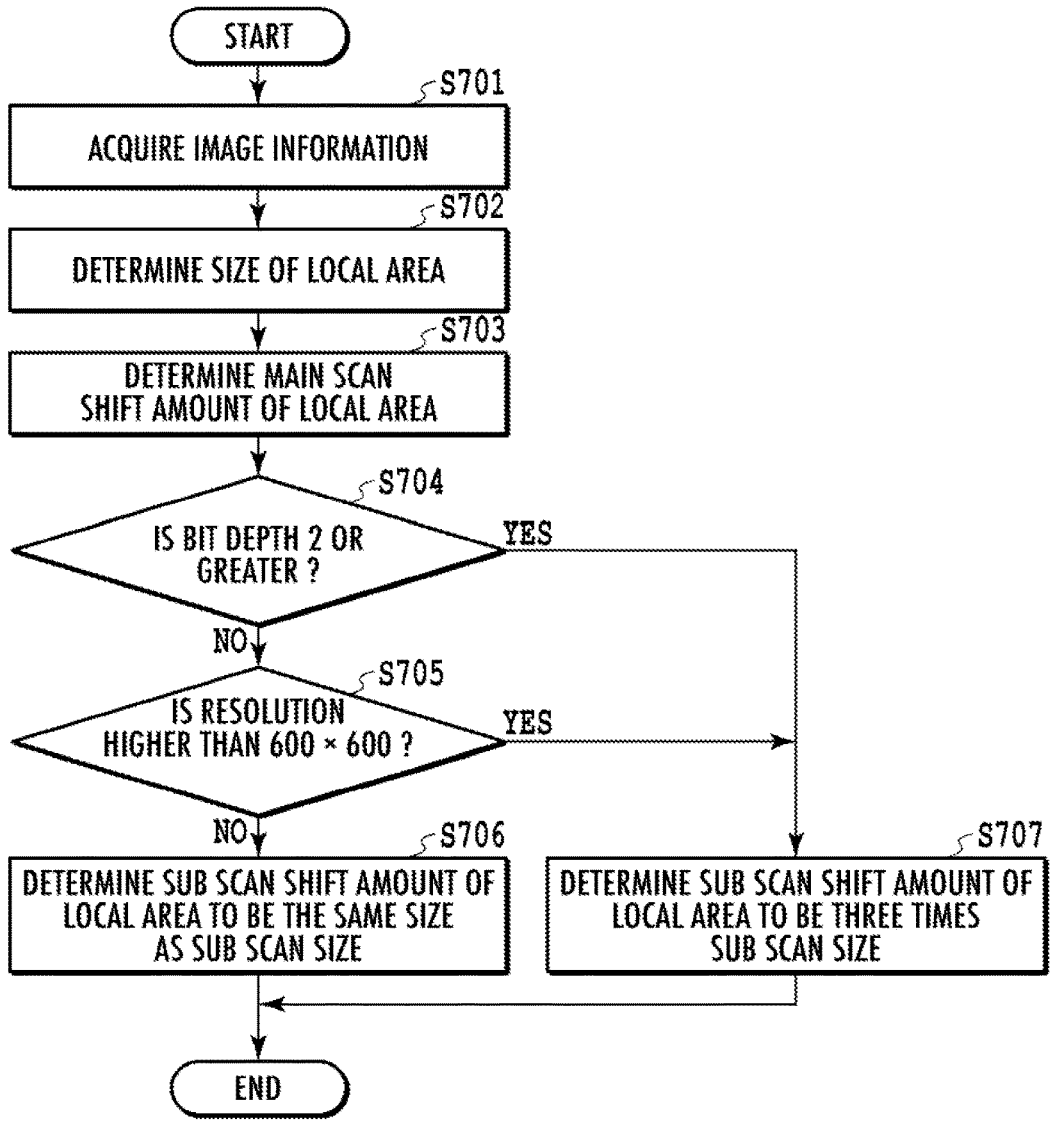
FIG. 7 is a flowchart showing an example of processing to determine a sampling condition in toner amount detection.

FIG. 7 is a flowchart showing an example of processing to determine the sampling condition in the toner amount detection. The processing shown in FIG. 7 is performed by the image analysis unit 132 in the case where the CMYK data of a target image is generated by the image generation unit 131.

The image analysis unit 132 acquires image information on the target image from the RAM 104 (step S701). The image information includes the bit depth and the resolution. Next, the image analysis unit 132 determines the main scan size and the sub scan size of the local area based on the table shown in FIG. 6 and the image information on the target image (step S702). Next, the image analysis unit 132 determines the main scan shift amount of the local area based on the table shown in FIG. 6 and the image information on the target image (step S703). As shown in FIG. 6, the main scan shift amount is determined to be the same value as the main scan size. Next, the image analysis unit 132 determines whether the bit depth of the image information is 2 bpp or greater (step S704). In a case when the bit depth is 2 bpp or greater (YES at step S704), the image analysis unit 132 determines the sub scan shift amount of the local area to be three times the sub scan size of the local area in accordance with the table shown in FIG. 6 (step S707). In a case when the bit depth of the image information is smaller than 2 bpp (NO at step S704), the image analysis unit 132 determines whether the resolution in the main scanning direction and the resolution in the sub scanning direction are higher than 600 dpi (step S705). In a case when both are higher than 600 dpi (YES at step S705), the processing advances to step S707. In a case when one of them is lower than or equal to 600 dpi (NO at step S705), the image analysis unit 132 determines the sub scan shift amount of the local area to be the same size as the sub scan size of the local area in accordance with the table shown in FIG. 6 (step S706).

As above, in the present embodiment, the sampling condition is determined based on the bit depth and the resolution. Then, in accordance with the determined sampling condition, sampling is performed in the toner amount detection. Due to this, even in a case when an image whose bit depth is great and whose resolution is high (image that takes much time for the image analysis of the toner amount detection) is printed, it is made possible to prevent the processing time of the toner amount detection from becoming longer than the processing time of the printing processing. Because of this, it is possible to suppress a wait time of the printing processing as shown in FIG. 3 from occurring. Consequently, even in a case when a plurality of images is printed continuously, the printing speed is not reduced.

Further, in the present embodiment, the sampling condition is determined in accordance with the bit depth and the resolution, and therefore, it is possible to set a more appropriate sampling condition for each image. Consequently, it is made possible to obtain more accurate analysis results (amount of toner). Due to this, the control of the fixing device is performed appropriately, and therefore, it is possible to suppress power consumption of the image forming apparatus.

Further, in the present embodiment, the processing time required for the toner amount detection is reduced by the software processing (adjustment of sampling interval). Due to this, it is possible to suppress the reduction in the printing speed, which is caused by the processing time of the toner amount detection becoming longer than the processing time of the printing processing, with a simpler configuration without adding hardware.

Further, in the present embodiment, the image analysis to detect the amount of toner (density value) is taken as an example, but in a case when a pixel value (for example, RGB values or luminance) other than the density value is used in the subsequent processing, it may also be possible to apply the present embodiment to the image analysis to detect the pixel value.

Further, in the present embodiment, the electrophotographic image forming apparatus is taken as an example, but it may also be possible to apply the present embodiment to an ink jet image forming apparatus and the like. For example, it may also be possible to apply the present embodiment to the image analysis to detect the pixel value that is used in the printing processing of the ink jet image forming apparatus.

Further, in the present embodiment, the processing to generate CMYK data from print data and to detect the amount of toner from the CMYK data is taken as an example, but in a case when other color materials are used, it is sufficient to perform image generation and a software image analysis corresponding to those color materials.

Further, in the present embodiment, the image forming apparatus is taken as an example, which switches the fixing speed of the fixing device from the high-speed mode to the low-speed mode in the case where the above-described consecutive area is detected from the target image. However, it may also be possible for the image forming apparatus to perform control to switch the fixing temperature of the fixing device from the low-temperature mode to the high-temperature mode in the case where the above-described consecutive area is detected from the target image.

Figure 8:
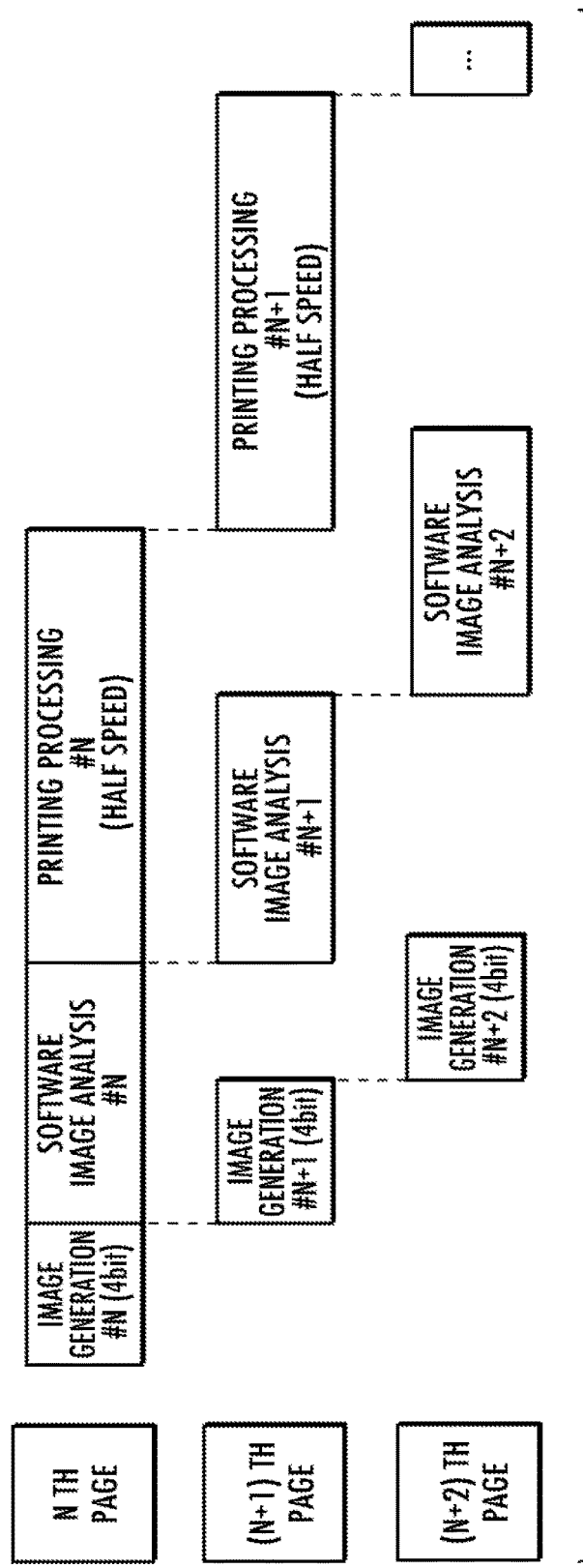
FIG. 8 is a timing chart showing an example of timing at which a software image analysis and printing processing are performed in the first embodiment.
Figure 9:
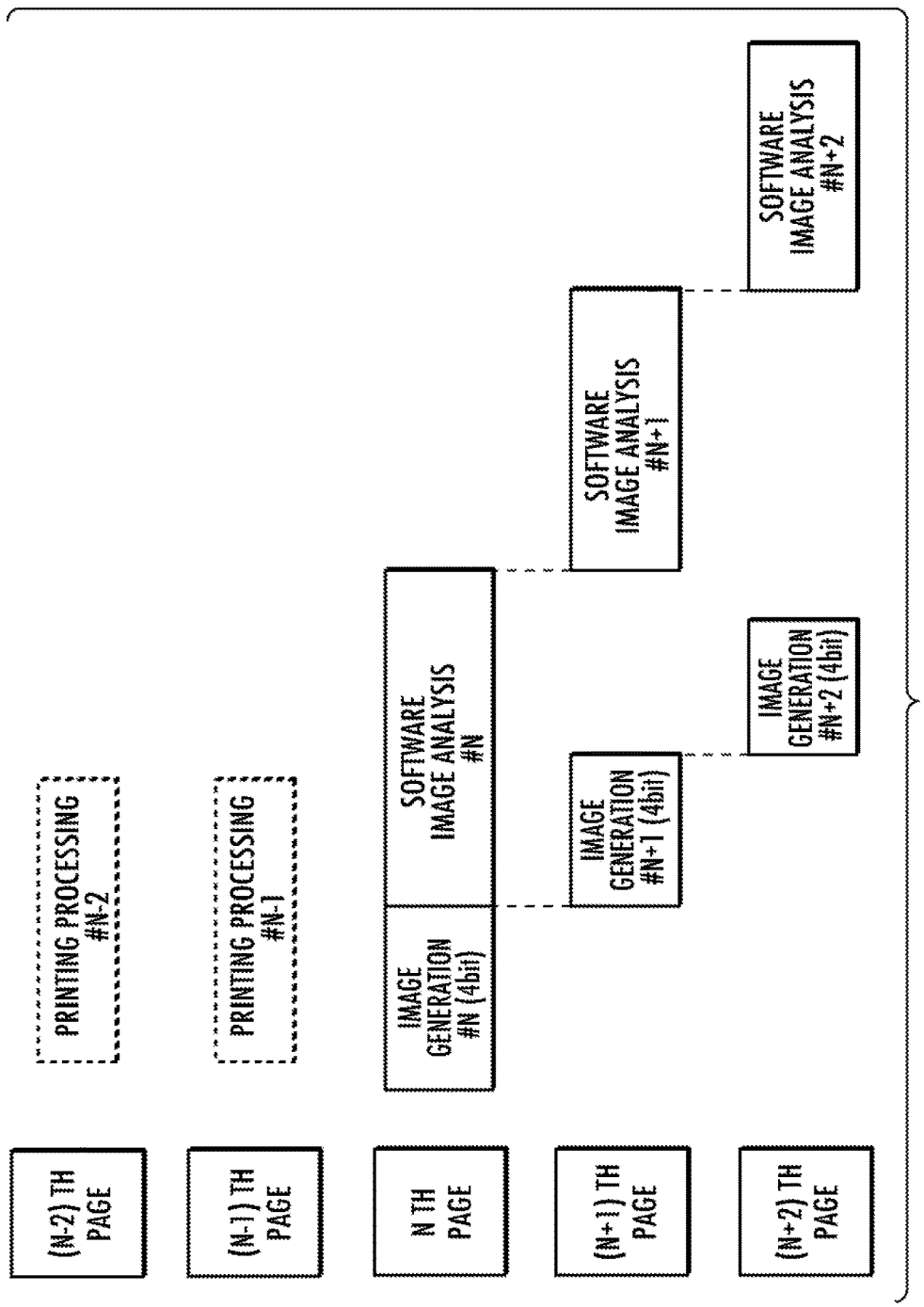
FIG. 9 is a timing chart showing another example of timing at which a software image analysis and printing processing are performed in the first embodiment.
Figure 10:
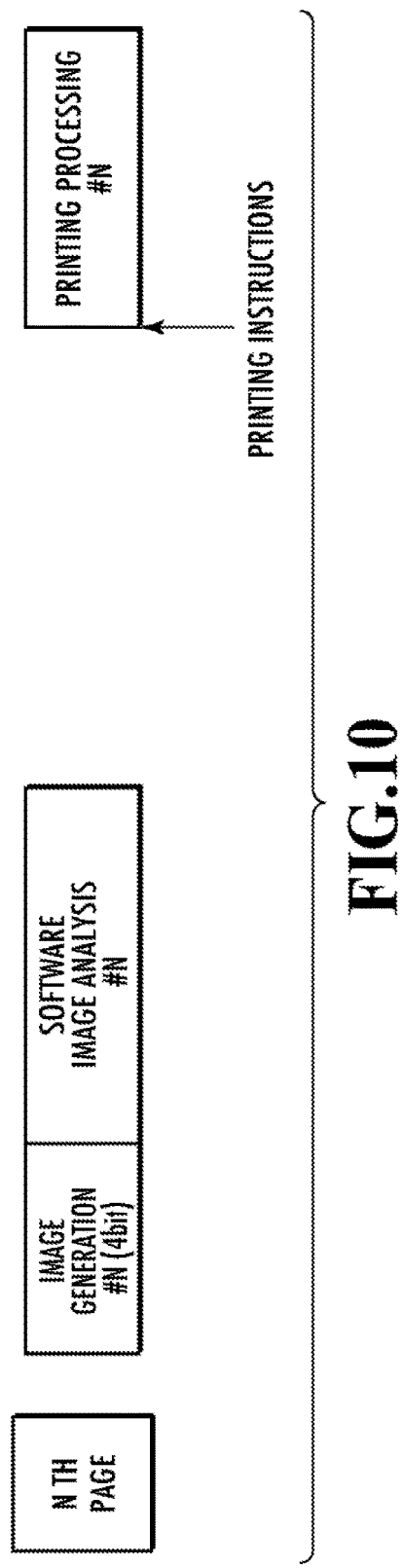
FIG. 10 is a timing chart showing another example of timing at which a software image analysis and printing processing are performed in the first embodiment.

Next, by using FIG. 8 to FIG. 10, the software image analysis in the case where the printing processing is performed by the half-speed operation, in the case where the printing processing is in the waiting state because the sheet has run out and the like, and in a case when a print job for which hold printing is specified is received is explained.

FIG. 8 is a timing chart showing an example of the timing at which the software image analysis and the printing processing are performed in the first embodiment. FIG. 8 shows a timing chart in a case when the printing processing is performed by the half-speed operation. Consequently, the processing time of the printing processing is longer than the processing time of the software image analysis. For example, in the case where the sheet type specified in the print data is a thick sheet, the printing processing is performed by the half-speed operation. The control at the time of performing the image generation, the software image analysis, and the printing processing is the same as that in FIG. 2. Here, it is assumed that an image with a bit depth of 4 (4 bpp) is generated from print data. Consequently, as in the example shown in FIG. 3, the processing time of the software image analyses #N, #N+1, and #N+2 becomes longer. However, the printing processing is performed by the half-speed operation, and therefore, a wait does not occur between the printing processing #N and #N+1 and between the printing processing #N+1 and #N+2. As described above, even in a case when an image with a great bit depth (or high resolution) is generated, on a condition that the printing processing is performed by the half-speed operation, the processing time of each piece of printing processing becomes longer than the processing time of each software image analysis. Because of this, the reduction in the printing speed due to the software image analysis does not occur. That is, in the example shown in FIG. 8, even in a case when the sampling interval is reduced in the software image analysis, the wait time of the printing processing as shown in FIG. 3 does not occur.

However, in the present embodiment, as shown in FIG. 6 and FIG. 7, for an image with a bit depth of 4, the sampling interval is set large in the toner amount analysis. Consequently, as will be described later by using FIG. 11, the image analysis unit 132 determines the sampling condition by further taking into consideration the sheet conveyance speed.

FIG. 9 is a timing chart showing another example of the timing at which the software image analysis and the printing processing are performed in the first embodiment. FIG. 9 shows a timing chart in a case when the printing processing is in the waiting state and the processing time of the image analysis does not affect the start of the printing processing. The control at the time of performing each piece of the processing of the image generation, the software image analysis, and the printing processing is the same as that in FIG. 2. Here, it is assumed that an image with a bit depth of 4 (4 bpp) is generated from print data. Consequently, as in the example shown in FIG. 3, the processing time of the software image analyses #N, #N+1, and #N+2 becomes longer. Printing processing #N−2 and #N−1 in FIG. 9 is in the state of waiting for sheet replenishment because the sheet specified in the print data is not set in the printer 123 at the time of the start of processing (that is, no sheet), and therefore, the processing is not started. As described above, even in a case when an image with a great bit depth (or high resolution) is generated, on a condition that the printing processing is in the waiting state because of no sheet, as shown in FIG. 9, before each piece of printing processing is started, it is possible to complete the software image analysis corresponding to each piece of printing processing. Consequently, the reduction in the printing speed due to the software image analysis does not occur as a matter of course. That is, in the example shown in FIG. 9, even in a case when the sampling interval is reduced in the software image analysis, the wait time of the printing processing as shown in FIG. 3 does not occur.

However, in the present embodiment, as show in FIG. 6 and FIG. 7, for an image with a bit depth of 4, the sampling interval in the toner amount analysis is set large. Consequently, as will be described later by using FIG. 11, the image analysis unit 132 determines the sampling condition by further taking into consideration whether the printing processing is in the waiting state.

FIG. 10 is a timing chart showing another example of the timing at which the software image analysis and the printing processing are performed in the first embodiment. FIG. 10 shows a timing chart in a case when a print job for which hold printing is specified is received. Consequently, the image data after the software image analysis, which is output by the image analysis unit 132, is held in the RAM 104 of the image forming apparatus 100. Then, in a case when a user inputs printing instructions via the operation unit 121, the printer 123 reads the image data held in the RAM 104 and performs the printing processing. The control at the time of performing the image generation, the software image analysis, and the printing processing is the same as that in FIG. 2. Here, for simplification of explanation, a print job that prints only the Nth page is taken as an example. Further, it is assumed that an image with a bit depth of 4 (4 bpp) is generated from print data. Consequently, as in the example shown in FIG. 3, the processing time of the software image analysis #N becomes longer. However, in the case of the state when hold printing is specified for a print job and before receiving printing instructions for the print job, it is possible to complete the software image analysis corresponding to each piece of printing processing before each piece of printing processing is started as shown in FIG. 10. Consequently, the reduction in the printing speed due to the software image analysis does not occur as a matter of course. That is, in the example shown in FIG. 10, even in a case when the sampling interval is reduced in the software image analysis, the wait time of the printing processing as shown in FIG. 3 does not occur.

However, in the present embodiment, as shown in FIG. 6 and FIG. 7, for an image with a bit depth of 4, the sampling interval in the toner amount analysis is set large. Consequently, as will be described later by using FIG. 11, the image analysis unit 132 determines the sampling condition by further determining whether hold printing is specified for a print job and printing instructions are given for the print job.

Figure 11:
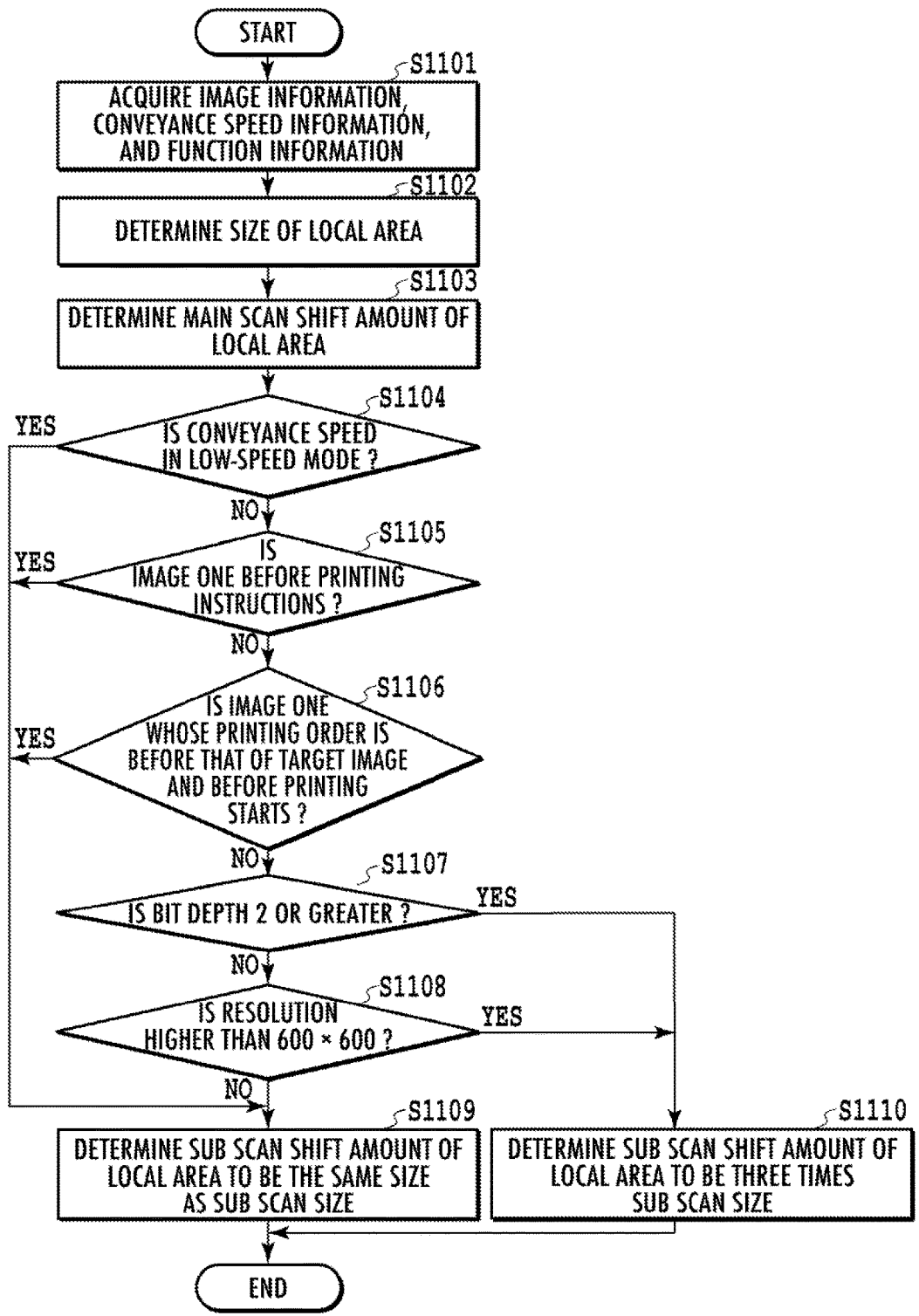
FIG. 11 is a flowchart showing another example of processing to determine a sampling condition in toner amount detection.

FIG. 11 is a flowchart showing another example of the processing to determine the sampling condition in the toner amount detection. FIG. 11 shows the processing to determine the sampling condition by taking into consideration a case when the printing processing is performed by the half-speed operation, a case when the printing processing is in the waiting state because the sheet has run out and the like, and a case when a print job for which hold printing is specified is received. The processing shown in FIG. 11 is performed by the image analysis unit 132 in the case where the CMYK data of a target image is generated by the image generation unit 131.

The image analysis unit 132 acquires image information on a target image, conveyance speed information, and function information from the RAM 104 (step S1101). The conveyance speed information is information indicating the conveyance speed of a sheet at the time of printing. In the present embodiment, in a case when setting that requires a change in the conveyance speed, such as the printing mode setting for the image forming apparatus 100, is performed, the controller 101 stores information indicating the conveyance speed in accordance with the setting in the RAM 104 as the conveyance speed information. The function information is information including the hold printing setting and the printing start instructions. In the present embodiment, in a case when a print job is received from the external device 129, the controller 101 stores the function information included in the print job in the RAM 104 along with the image information. Next, the image analysis unit 132 determines the main scan size and the sub scan size of the local area and the main scan shift amount of the local area in accordance with the table shown in FIG. 6 and the image information on the target image (steps S1102 and S1103). Next, the image analysis unit 132 determines whether or not the conveyance speed is lower than or equal to a predetermined speed. In the present embodiment, the image analysis unit 132 determines whether the conveyance mode indicated by the conveyance speed information is a low-speed mode (step S1104). The low-speed mode is a conveyance mode in which, for example, printing processing is performed by the half-speed operation. In a case when the conveyance mode is the low-speed mode (YES at step S1104), the processing advances to step S1109. In a case when the conveyance mode is not the low-speed mode (NO at step S1104), the image analysis unit 132 determines whether or not the hold printing is specified and before the printing instructions are input by using the function information (step S1105). In a case when the hold printing is specified and before the printing instructions are input (YES at step S1105), the processing advances to step S1109. In the other cases (NO at step S1105), the image analysis unit 132 determines whether there is an image that waits for printing processing (image whose printing order is before that of the target image and before the printing starts) (step S1106). In a case when there is an image that waits for printing processing (YES at step S1106), the processing advances to step S1109. In a case when there is not an image that waits for printing processing (NO at step S1106), the processing advances to step S1107. The processing at steps S1107 to S1110 is the same as the processing at steps S704 to S707 shown in FIG. 4, and therefore, explanation is omitted.

As above, by the processing shown in FIG. 11, in a case when printing processing is performed by the half-speed operation, in a case when printing processing is in the waiting state, and so on, it is possible to prevent the sampling interval from being set unnecessarily large.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present invention, it is possible to appropriately set the sampling condition in an image analysis so that the image analysis is completed within a required time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (a) a memory device that stores a set of instructions; and
   (b) at least on processor that executes the set of instructions:
      (i) to set a sampling condition under which a pixel of an image is sampled based on information indicating at least a number of bits of a pixel of the image;
      (ii) to sample a pixel of the image based on a set sampling condition by the setting unit; and
      (iii) to analyze the image based on sampled pixel data,
      wherein, in a case when a number of bits of a pixel of the image is greater than or equal to a predetermined number of bits, a sampling condition is set so that a sampling interval becomes larger than that in a case when a number of bits of a pixel of the image is less than the predetermined number of bits.

2. The image processing apparatus according to claim 1, wherein the at least on processor executes instructions in the memory device to set the sampling condition based on information indicating a resolution of the image.

3. The image processing apparatus according to claim 1, wherein the image analysis is processing to detect a pixel value for each local area of the image, and the at least one processor executes instructions in the memory device:
   to perform the image analysis while shifting the local area, which is a detection target, in a main scanning direction and in a sub scanning direction, and
   to set, as the sampling conditions, amounts of shift in a main scanning direction and in a sub scanning direction of the local area in the image analysis.

4. The image processing apparatus according to claim 3, wherein the at least one processor executes instructions in the memory device to set, in a case when a bit depth of the image is greater than or equal to a predetermined bit depth, at least one of amounts of shift in a main scanning direction and in a sub scanning direction of the local area to a value larger than a size in a corresponding direction of the local area.

5. The image processing apparatus according to claim 4, wherein the at least one processor executes instructions in the memory device to set, in a case when a bit depth of the image is smaller than the predetermined bit depth, each of amounts of shift in a main scanning direction and in a sub scanning direction of the local area in the image analysis to a value equal to a size in a corresponding direction of the local area.

6. The image processing apparatus according to claim 3, further comprising:
   a storage that stores a table by which it is possible to derive amounts of shift in a main scanning direction and in a sub scanning direction of the local area in the image analysis from a bit depth and a resolution,
   wherein the at least one processor executes instructions in the memory device to set the sampling condition based on a bit depth and a resolution of the image and the table.

7. An image processing method comprising:
   (a) storing a set of instructions in a memory; and
   (b) executing the set of instructions by at least one processor:
      (i) to set a sampling condition under which a pixel of an image is sampled based on information indicating at least a number of bits of a pixel of the image;
      (ii) to set sampling a pixel of the image based on a set sampling condition; and
      (iii) to analyze the image based on sampled pixel data,
      wherein, in a case when a number of bits of a pixel of the image is greater than or equal to a predetermined number of bits, setting a sampling condition so that a sampling interval becomes larger than that in a case when a number of bits of a pixel of the image is less than the predetermined number of bits.

8. A non-transitory computer readable storage medium storing a program for causing a computer to perform an image processing method, the method comprising:
   (a) storing a set of instructions in a memory; and
   (b) executing the set of instructions by at least one processor:
      (i) to set a sampling condition under which a pixel of an image is sampled based on information indicating at least a number of bits of a pixel of the image;
      (ii) to set sampling a pixel of the image based on a set sampling condition; and
      (iii) to analyze the image based on sampled pixel data,
      wherein, in a case when a number of bits of a pixel of the image is greater than or equal to a predetermined number of bits, setting a sampling condition so that a sampling interval becomes larger than that in a case when a number of bits of a pixel of the image is less than the predetermined number of bits.

* * * * *